United States Patent [19]

Carr et al.

[11] Patent Number: 4,999,324

[45] Date of Patent: Mar. 12, 1991

[54] METHOD OF MANUFACTURING CERAMIC ARTIFACTS

[75] Inventors: Neil S. Carr, Kempton Park; Adrian W. Paterson, Pretoria, both of South Africa

[73] Assignee: Pathold Investments, Co., Inc., Douglas, Isle of Man

[21] Appl. No.: 283,239

[22] Filed: Dec. 12, 1988

[30] Foreign Application Priority Data

Jan. 18, 1988 [ZA] South Africa ............... 88/0316

[51] Int. Cl.$^5$ .................. C04B 35/10; C04B 35/48
[52] U.S. Cl. ............................. 501/107; 501/127
[58] Field of Search .................. 501/107, 127, 104

[56] References Cited

U.S. PATENT DOCUMENTS

| | | | |
|---|---|---|---|
| 3,972,722 | 8/1976 | Holt et al. | 501/107 |
| 4,421,861 | 12/1983 | Claussen | 501/103 |
| 4,829,028 | 5/1989 | Seki et al. | 501/107 |

FOREIGN PATENT DOCUMENTS

| | | | |
|---|---|---|---|
| 62889/86 | 3/1987 | Australia. | |
| 0898008 | 2/1984 | Belgium. | |
| 0898604 | 5/1984 | Belgium. | |
| 0561305 | 8/1958 | Canada | 501/107 |
| 0219474 | 3/1985 | Fed. Rep. of Germany | 501/107 |
| 1005594 | 4/1952 | France. | |
| 0354019 | 6/1961 | Switzerland. | |
| 0947441 | 1/1964 | United Kingdom | 501/107 |
| 2147893 | 5/1985 | United Kingdom. | |

OTHER PUBLICATIONS

Sorrell C. A., et al. Subsolidus Equilibria and Stabilization of Tetragonal $ZrO_2$ in the System $ZrO_2$-$Al_2O_3$-$SiO_2$, Journal of the American Ceramic Society, vol. 60, No. 11-12, pp. 495-499 (1977).

DiRupo E., et al, Identification of Stages in Reactive Hot-Pressing, Journal of the American Ceramic Society, vol. 61 No. 9-10, pp. 468-469 (1978).

Claussen, N., et al., Mechanical Properties of Sintered, in Situ-Reacted Mullite-Zirconia Composites, Journal of the American Ceramic Society, vol. 63, No. 3-4, pp. 228-229 (1979).

Pena, P., et al., Multi-Component Toughened Ceramic Materials Obtained by Reaction Sintering, Journal of Materials Science 20 (1985), 2011-2022.

Miranzo, P., et al, Multi-Component Toughened Ceramic Materials; Obtained by Reaction Sintering, Journal of Materials Science 20 (1985) 2702-2710.

Melo, M. F. et al, Multi-Component Toughened Ceramic Materials Obtained by Reaction Sintering, Journal of Material Science 20 (1985) 2711-2718.

Primary Examiner—William R. Dixon, Jr.
Assistant Examiner—Anthony J. Green
Attorney, Agent, or Firm—Kenyon & Kenyon

[57] ABSTRACT

The invention provides a method of making a ceramic artifact by sintering a mixture of particulate zircon and alumina or precursors thereof. The method involves doping the mixture by dispersing a dopant therein prior to sintering. The dopant comprises BaO, SrO, NiO, ZnO or mixtures thereof.

9 Claims, 6 Drawing Sheets

METHOD OF MANUFACTURING CERAMIC ARTIFACTS

THIS INVENTION relates to a method of manufacturing a ceramic artifact. In particular it relates to a method of manufacturing a ceramic artifact suitable for use in structural, wear resistant and refractory applications, by sintering a mixture of zircon ($ZrSiO_4$) and alumina ($Al_2O_3$), to transform them into a product consisting partly or predominantly of zirconia and mullite. Zirconia is $ZrO_2$ and mullite is usually represented as $Al_6Si_2O_{13}$ but can also be represented as $xAl_2O_3.2SiO_2$ in which x is 3-4, so that it has a variable alumina content of 70-83% by mass and a variable $SiO_2$ content of 17-30% by mass.

According to the invention there is provided a method of manufacturing a ceramic artifact by sintering a mixture of particulate zircon [$ZrSiO_4$] or a precursor thereof and particulate alumina [$Al_2O_3$] or a precursor thereof, the method including doping the mixture by dispersing therein a dopant comprising at least one member of the group consisting of barium oxide [BaO], strontium oxide [SrO], nickel oxide [NiO], zinc oxide [ZnO] and the precursors thereof, prior to the sintering.

The doped mixture may comprise 20-80% by mass of the $ZrSiO_4$ or its precursor [as the oxide], preferably 40-70% by mass thereof, 20-80% by mass of the $Al_2O_3$ or its precursor [as the oxide], preferably 30-70% by mass thereof, having 0,01-25% by mass of said dopant [as the oxide] dispersed therein, preferably 0,05-6% by mass thereof. The dopant may be entirely any one of BaO, SrO, NiO or ZnO or it may comprise a mixture in any suitable proportions of any two or more thereof.

The method may include dispersing in the mixture, prior to the sintering, an additive comprising at least one member of the group consisting of boron oxide [$B_2O_3$], calcium oxide [CaO], magnesium oxide [MgO], lithium oxide [$Li_2O$], titanium dioxide [$TiO_2$] and the precursors thereof. 0,05-10% by mass of the additive [as the oxide] may be dispersed in the mixture, preferably 0,05-5% by mass thereof.

As indicated above, although the proportions of the dopants and additives are specified in terms of mass of the oxides of the metals in question, they may naturally be present in the mixture before sintering as the equivalent amounts of the precursors of said oxides, i.e. compounds such as the carbonates or hydroxides of said metals, which, during heating to the sintering temperature, decompose to form said oxides. Similarly, precursors of the $Al_2O_3$ starting material may be used, for example alumina hydrates, e.g. a monohydrate such as a boehmite, which dehydroxilates to alumina during heating up to the sintering temperature; precursors of zircon may also be used, provided they decompose or combine to form zircon during the heating up to the sintering temperature.

The mixture which is sintered may be formed in any convenient fashion. Thus the mixture may be formed by milling, e.g. wet milling, so that the mixture has, before it is sintered, an average particle size of at most 10 microns, preferably at most 1 micron. The milling may be effected by means of a suitable attrition mill. The milled mixture may then be dried, e.g. in an oven, or by spray- or freeze-drying.

The sintering may be by heating at a rate of 10°-600° C./hr, preferably at a rate of 25°-300° C./hr, from ambient temperature up to a maximum temperature in the range 1200°-1700° C., preferably 1350° to 1500° C., holding the maximum temperature for a period of at least 1 hr, and cooling the sintered material at a rate of 20°-500° C./hr, preferably 100°-300° C./hr. Heating plateaus or holds may be provided at certain temperatures for certain periods during the heating, at temperatures below the maximum temperature. Any holds of plateaus will usually be provided in the temperature range of 100°-1500° C., typically 200°-1400° C. These holds will typically last for ½ hr or more, e.g. up to 10 hrs, usually being in the range of ½ hr-5 hrs, more usually 1-2 hrs. The maximum temperature may be held for a period of 1-10 hrs, preferably 2-5 hrs.

Plateaus or holds may be provided during the cooling at certain temperatures and for certain periods. In particular, the method may include the step, during the cooling, of holding the temperature constant for a period of at least ½ hr, and optionally up to 5 hrs, preferably 1-2 hrs, at a temperature, below the maximum temperature, in the range 1000°-1450° C., preferably 1200°-1400° C. This hold is for the purpose of annealing the product. This annealing can involve removal of glassy phases therein by crystallization thereof, or it can involve the transformation of unstable crystalline phases.

Typically the artifact will be pressed in a green state after drying and prior to sintering. Pressing may be uniaxial and/or isostatic. When pressing is uniaxial it may be to a pressure in the range of 2-200MPa, preferable 10-50MPa. When the pressing is isostatic, it may be to a pressure in the range 50-300MPa, preferably 100-200MPa. For this purpose a binder such as a suitable wax or polyethylene glycol may be added to the mixture before pressing, e.g. before milling, in a proportion of 1-10% by mass on a water-free basis, preferably 2-4%. In a particular embodiment of the method, the method may accordingly include the steps, prior to the sintering, of dispersing a binder in the mixture and forming a green artifact from the mixture by pressing at a pressure in the range 2-200MPa. If necessary, after the drying and before the pressing, the mixture may be screened, after dry milling if necessary, through a screen of at most 600 micron screen size, preferably at most 300 micron screen size.

The invention will now be described by way of non-limiting illustration, with reference to the accompanying Examples and drawings, wherein.

In the Examples described hereunder, the zircon employed was obtained from Ferro Industrial Products, Brakpan, Transvaal Province, Republic of South Africa, as mined by Richards' Bay Minerals, Richard's Bay, Natal Province, Republic of South Africa. The alumina used was alpha-alumina obtained from Aluminium Company of America, Pittsburgh, Pa, U.S.A. The type of zircon used was that designated F.Z.O. super fine by Ferro Industrial Products and the type of alumina used was that designated Alcoa A16SG by Aluminium Company of America. Analyses of the zircon and alumina are set forth hereunder in the following table, Table 1.

TABLE 1

| Constituent | Zircon % by mass | Alumina % by mass |
|---|---|---|
| $Al_2O_3$ | 0,12 | 99,5 |
| $ZrO_2$ | 65,9 | — |
| $P_2O_5$ | 0,1 | — |
| $Na_2O$ | — | 0,08–0,10 |
| $Fe_2O_3$ | 0,08 | 0,01–0,03 |
| CaO | 0,09 | — |
| MgO | 0,02 | — |
| $SiO_2$ [Total] | 32,00 | 0,025–0,07 |
| $SiO_2$ [Free] | 0,20 | — |
| $H_2O$ | 0,10 | — |
| Loss on ignition | 0,20 | — |

In each case the average particle size in microns was determined using a Microtrac Particle Size Analyzer, Model No. 7995-30 having a measurement range of 0,12–42,2 microns, made by Leeds and Northrop Instruments, Sumneytown Pike, North Wales, Pa, U.S.A. The instrument makes use of laser light scattering techniques for particle size estimations. The average particle size of the zircon was found to be 0,66 microns, and that of the alumina to be 0,4 microns. A particle size distribution analyses was carried out of each of the zircon and alumina set forth in Table 1, and results of these analyses are set forth in the following table, Table 2.

TABLE 2

| Equivalent spherical diameter in microns | Cumulative percent by volume finer than stated size | |
|---|---|---|
| [μm] | Zircon | Alumina |
| 0,12 | 0,0 | 0,0 |
| 0,17 | 6,6 | 11,2 |
| 0,24 | 12,4 | 20,9 |
| 0,34 | 21,4 | 34,5 |
| 0,43 | 36,0 | 54,1 |
| 0,66 | 50,5 | 70,3 |
| 1,0 | 66,6 | 83,8 |
| 1,7 | 80,8 | 90,0 |
| 2,6 | 87,7 | 92,0 |
| 3,7 | 100,0 | 100,0 |

Details of the Examples are now described.

EXAMPLE 1

In this Example the aforegoing zircon and alumina were used as starting materials, together with a strontium oxide [SrO] dopant. The strontium oxide dopant was in fact added in the form of a laboratory grade strontium carbonate precursor [$SrCO_3$] of strontium oxide, obtained from E Merck of Darmstadt, Germany. The zircon, alumina and strontium oxide were sintered in accordance with the equation:

$0,04SrO + 3,04Al_2O_3 + 2,08ZrSiO_4 \rightarrow Al_6Si_2O_{13} + 2,08ZrO_2 + 0,04SrAl_2Si_2O_8.$ The starting materials, i.e. the zircon, alumina and strontium carbonate were mixed by wet milling in a Netzsch Molinex laboratory attritor. Several samples were prepared, and in each case 275g of stoichiometric mix according to the abovementioned equation was batch mixed employing 1 200 g of 2 mm zirconia bead grinding media and 150 ml of demineralized water. As a binder 6 g of polyethylene glycol was employed, obtained from BDH Chemicals of Poole, England. This polyethylene glycol was supplied by BDH Chemicals as having a molecular weight of 200, a density of about 1,12 g/cm² and a viscosity at 20° C. of 53–63 cS. This binder was added during the wet milling. The milled material was then granulated through a 300 micron sieve after oven drying at 100° C. for 3 hrs. Samples of the granulated dried mixture were then uniaxially pressed at 10MPa pressure and then cold isostatically pressed at 170MPa to form samples in the form of green artifacts.

The samples were then sintered in a Carbolite Kanthal furnace, Model No. RHF 16/10. The sintering was in accordance with three different heating regimes as set forth hereunder.

FIRST REGIME

According to this regime the samples were heated and cooled respectively at rates of 300° C./hr, a hold being provided during heating and a hold being provided at the maximum temperature. Thus, the samples were heated at 300° C./hr from ambient at 30° C. up to 500° C., followed by a hold at 500° C. of 1 hr, followed by further heating at 300° C./hr up to a maximum of 1490° C. At 1490° C. there was a hold of 1 hr, followed by cooling at 300° C. down to ambient at 30° C.

SECOND REGIME

This regime also employed heating and cooling rates of 300° C./hr, but employed two holds during heating and a hold at the maximum temperature. Thus, the samples were heated from 30° C. up to 500° C. at 300° C./hr, followed by a hold of 1 hr at 500° C. The samples were then heated from 500° C. up to 1450° C. at 300° C./hr, followed by a hold at 1450° C. of 2 hrs. Final heating took place thereafter at 300° C./hr from 1450° C. up to 1490° C. At the maximum temperature of 1490° C. there was a hold of 1 hr. The samples were then cooled at 300° C./hr from 1490° C. down to ambient at 30° C.

THIRD REGIME

This regime was essentially similar to the first regime, except that when a temperature of 1400° C. was reached during the heating, the heating rate was dropped to 50° C./hr, and the hold at the maximum temperature was for only 1 hr. Thus the samples were heated from ambient at 30° C. up to 500° C. at 300° C./hr, followed by a hold at 500° C. of 1 hr. The samples were then heated from 500° C. up to 1400° C. at 300° C./hr, followed by further heating from 1400° C. up to 1490° C. at 50° C./hr. There was a hold at the maximum temperature of 1490° C. of 1 hr, followed by cooling at 300° C./hr down to 30° C.

Various properties of the fired samples were then measured. Density was measured employing Archimedean techniques; strength was measured by a four-point bend test employing a 56 mm span and a load rate of 0,1 mm/min; toughness was measured from the cracks formed by a Vickers indentation device and calculated using the Anstis equation; and hardness was measured by a Vickers indentation device. Results are set forth in the following table, Table 3.

TABLE 3

| Heating regime | Density [g/cm³] | Strength [MPa] | Toughness [MPa.m¹] | Vickers Hardness [GPa] | Young's Modulus [GPa] |
| --- | --- | --- | --- | --- | --- |
| First | 3,86 | 150 | 3,5–3,8 | 12,3 | 220 |
| Second | 3,89 | 210 | 3,5–3,8 | 12,3 | 224 |
| Third | 3,91 | 225 | 3,5–3,8 | 12,3 | 230 |

Abrasive wear tests were carried out employing quartz with a mean grit size of 220 microns. The quartz was fired using a sand blasting nozzle at targets constituted by the above-mentioned samples, at a rate of 400 g quartz fired over a period of 20 minutes. Compressed air was used as the carrier at a pressure of 160 kPa. Tests were carried out at angles of impingement of the quartz on the samples of 90° and 30° C. respectively. The end of the sand blasting nozzle was held 50 mm from the target in each case. Two commercially available aluminas were used for comparative purposes, being respectively nominally 90% and 94% aluminas. In each case erosion rate was measured as mg of material lost/kg of quartz fired. The samples made in accordance with the present invention displayed substantially higher wear resistance than the commercially available aluminas, results being set out in the following table, Table 4.

TABLE 4

| Target Material | Material Lost [mg/kg] | |
| --- | --- | --- |
| | 90° impingement angle | 30° impingement angle |
| 90% alumina | 74 | 11 |
| 94% alumina | 51 | 12 |
| Samples from first regime | 6 | 4 |
| Samples from second regime | 6 | 3,5 |

Figure 1:
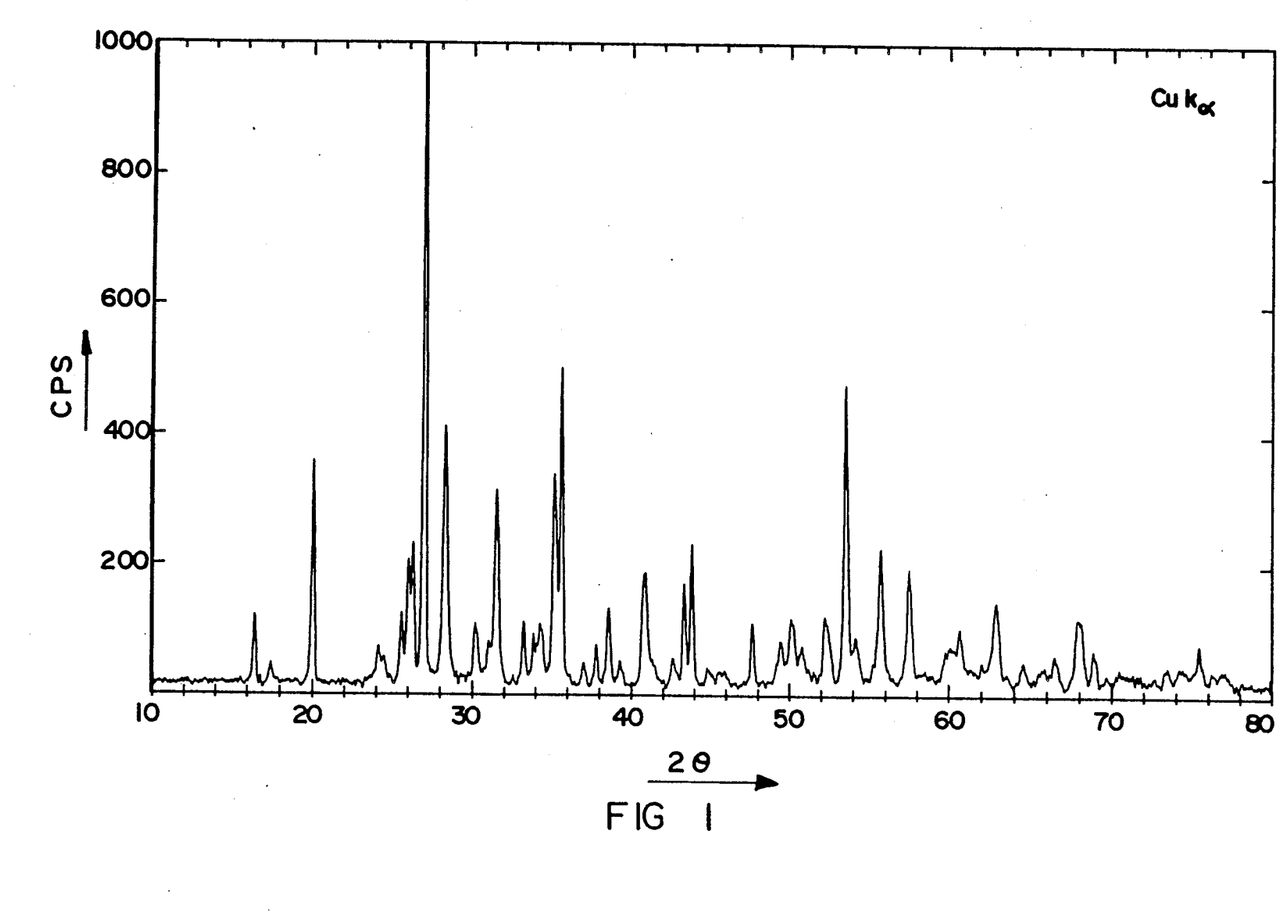
FIG. 1 illustrates an X-ray diffraction trace of an artifact sample in accordance with the invention.

An X-ray diffraction trace was obtained of one of the samples according to this Example, fired according to the third heating regime. This is set forth in FIG. 1 of the drawings, as a plot of counts/sec [CPS] against 2 theta Bragg angle. FIG. 1 shows that firing of this sample had converted approximately half of the zircon-/alumina starting material to zirconia/mullite.

EXAMPLE 2

In this Example, zircon, alumina and strontium oxide [the same starting materials as Example 1] were sintered in accordance with the equation:

The procedure followed in this Example was substantially the same as that described above for Example 1, except that the heating regimes were different, there being once again three separate heating regimes as set forth hereunder.

FIRST REGIME

According to this regime heating was from 30° C. ambient temperature up to 500° C. at 300° C./hr followed by a hold at 500° C. of 1 hr. Heating then took place from 500° C. up to a maximum temperature of 1425° C. at 300° C./hr with a hold of 3 hrs at 1425° C. Cooling then took place down to 30° C. ambient temperature at a rate of 300° C./hr.

SECOND HEATING REGIME

This was substantially the same as the first regime except that the maximum temperature where the 3 hr hold took place was at 1450° C.

THIRD REGIME

This regime was substantially the same as the first and second regimes, except that the maximum temperature at which the 3 hr hold took place was 1475° C.

A sample heated in accordance with the second heating regime was found to have a density of 4,12 g/cm³; a strength of 220 MPa; a toughness of 3,2–3,7MPa.m¹; a Vickers hardness of 11,5GPa and a Young's modulus of 257GPa.

Figure 2:
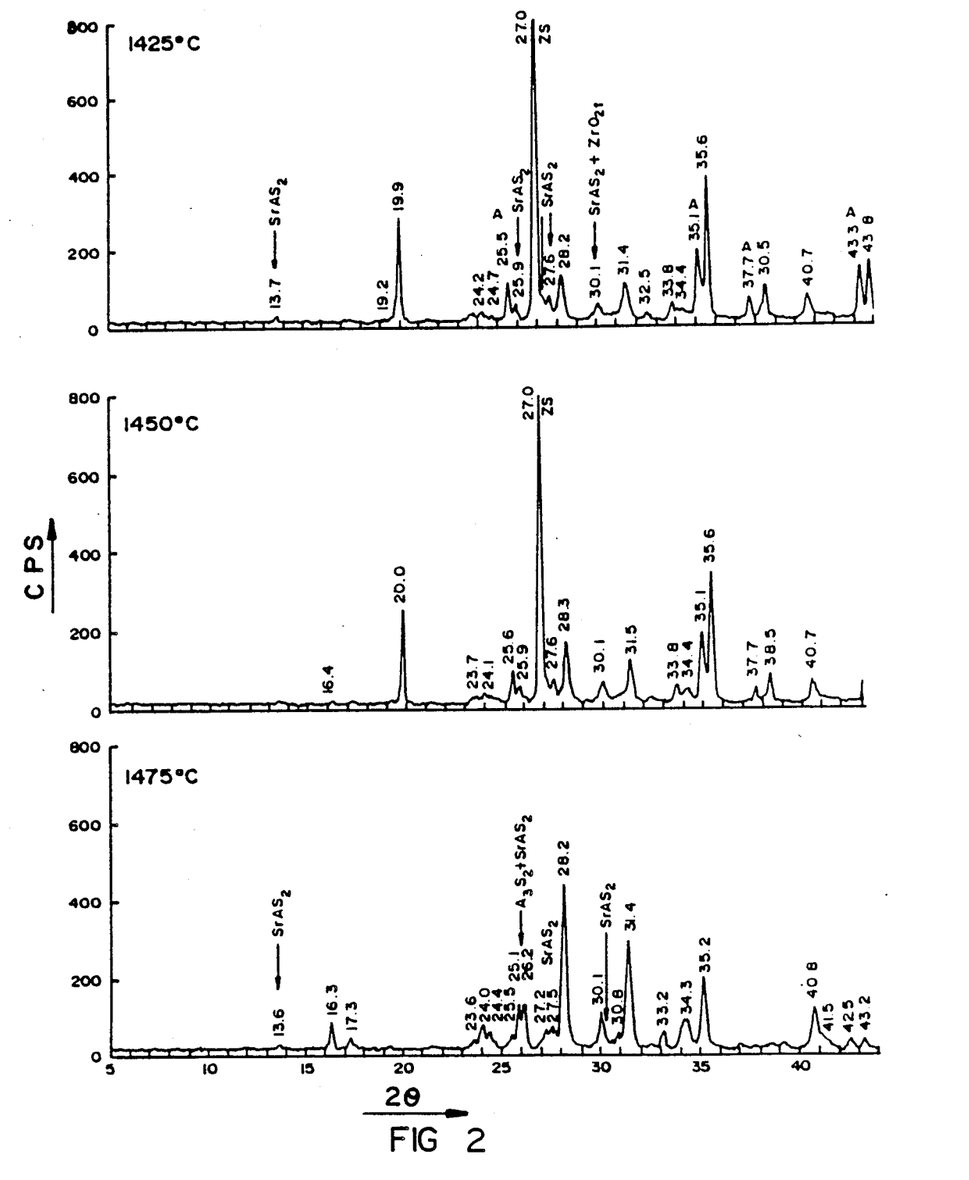
FIG. 2 illustrates X-ray diffraction traces of samples of artifacts heated to different maximum heating temperatures in accordance with the invention.

X-ray diffraction traces are shown in FIG. 2 of the drawings, similar to the trace of FIG. 1, for samples heated in accordance with each of the three heating regimes of this Example. These traces show a conversion from a zircon/alumina starting material to a zirconia/mullite artifact. It was noted during the third heating regime that the sintering was accompanied by liquid exudation at 1475° C.

EXAMPLE 3

In this Example a starting material was prepared comprising 10,3 g $BaCO_3$, 87,36 g $Al_2O_3$, 104,64 g $ZrSiO_4$ and 9,96 g polyethylene glycol. The alumina, zircon and polyethylene glycol were as described above for Example 1, and the $BaCO_3$ was of laboratory grade. The starting mixture was milled in the same fashion as Example 1, employing 1,2 kg of the 2 mm diameter zirconia grinding medium, for 2 hrs and employing 250 ml demineralized water. The resultant mix was dried for 16 hrs at 85° C. in a conventional drying oven and sieved through a 300 micron mesh screen. Samples were pressed as described in Example 1, and were heated from 30° C. ambient temperature at 300° C./hr to respective maximum temperatures of 1450° C., 1475° C., 1500° C. and 1550° C., there being in each case a 4 hr hold at the maximum temperature, followed by cooling to ambient temperature at 300° C./hr.

The samples fired to the various maximum temperatures and cooled to ambient as described above had certain of their mechanical properties tested, and these are set forth in the following table, Table 5.

TABLE 5

| Maximum Firing Temperature [°C.] | Density g/cm³ | Apparent Porosity [%] | Young's Modulus [GPa] | Vickers Hardness [GPa] | Toughness [MPa/m¹] |
| --- | --- | --- | --- | --- | --- |
| 1450 | 4,007 | 0,02 | 218 | 11,3 | 3,7 |
| 1475 | 3,822 | 0,04 | 193 | 9,7 | — |
| 1500 | 3,774 | 0,02 | 189 | — | — |
| 1550 | 3,746 | 0,05 | 185 | — | — |

Apparent porosity was measured by the amount of residual water retained in each sample after it had been subjected to a vacuum and then immersed in water.

Figure 3:
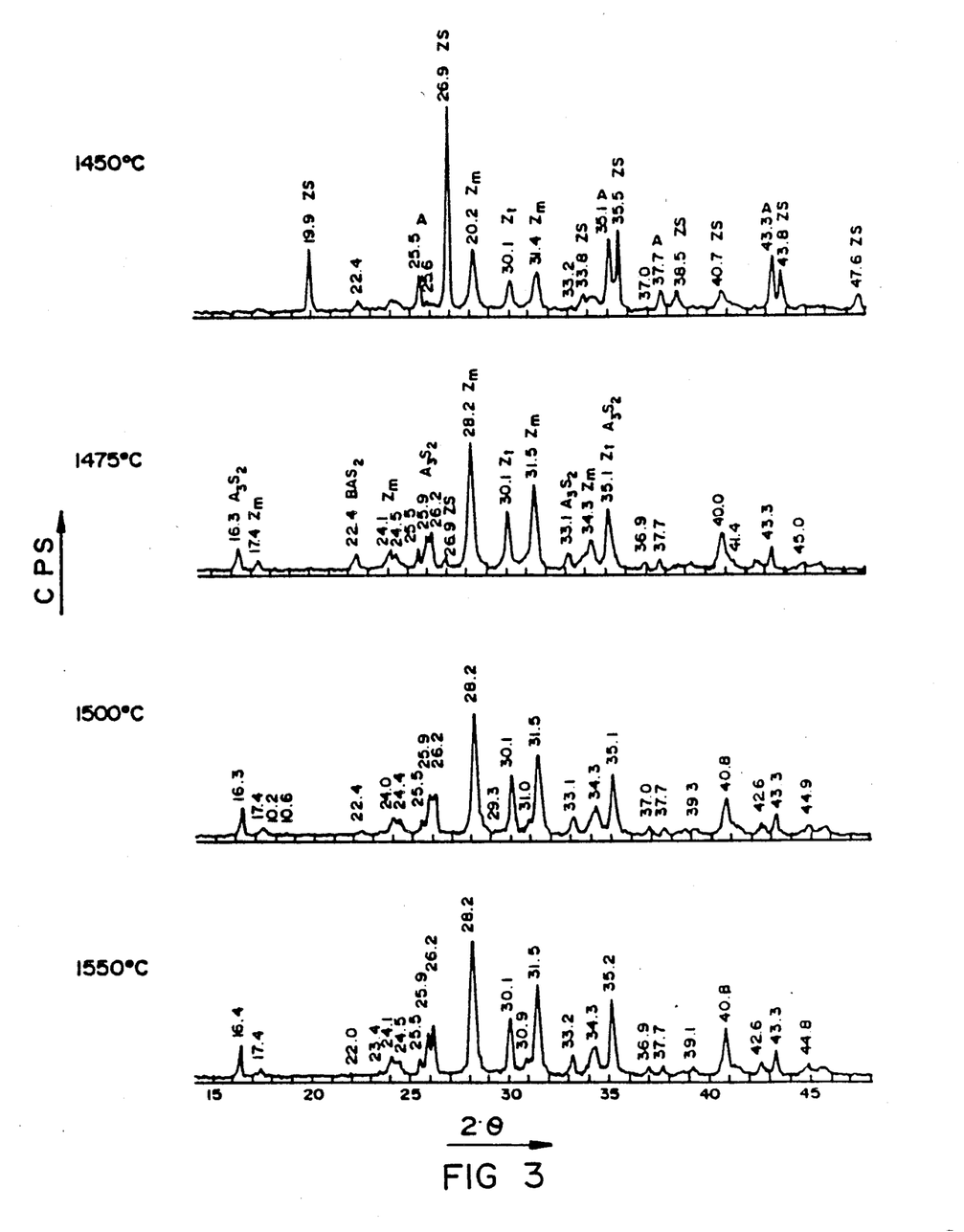
FIG. 3 illustrates X-ray diffraction traces of samples of artifacts employing alumina, zircon, polyethylene glycol and barium carbonate heated to different maximum temperatures in accordance with the invention.

X-ray diffraction traces for the samples heated respectively to 1450° C., 1500° C. and 1550° C. are shown in FIG. 3. These display a transformation from zircon/alumina [1450° C.] to zirconia/mullite [1475° C.]. The samples fired at 1450° C. and 1550° C. show no sign of $BaO.Al_2O_3.2SiO_3$ [celsian].

Figure 4:
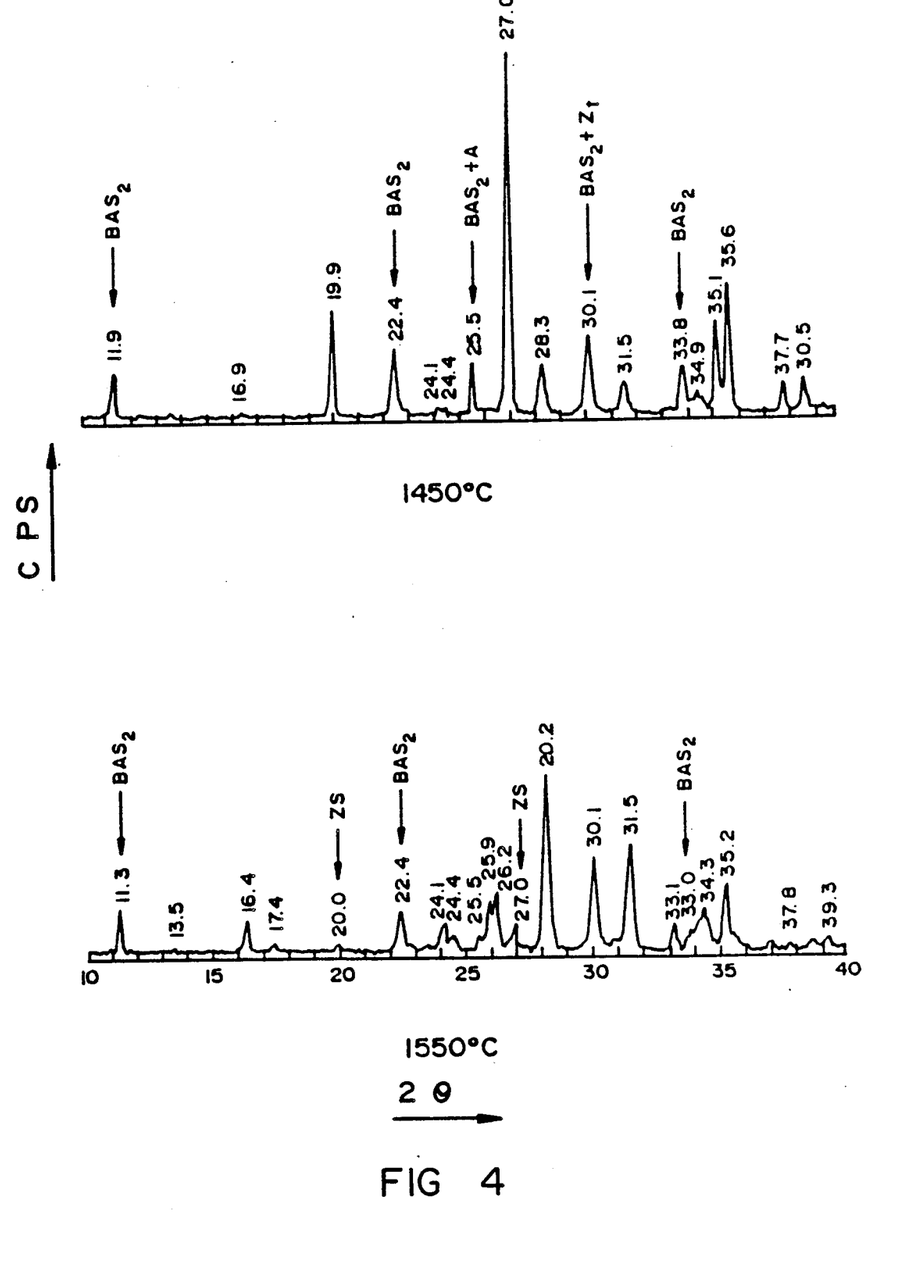
FIG. 4 illustrates X-ray diffraction traces of samples of artifacts made from zircon, alumina and nickel oxide in accordance with the invention.

The firings to 1450° C. and 1550° C. were repeated, except that, during cooling, they were subjected to an annealing hold of 3 hrs at 1300° C. X-ray diffraction traces of the products obtained from these annealed samples are shown in FIG. 4, from which it is apparent that one of the crystal forms of celsian appeared, together with a slight reappearance of zircon. This demonstrated the potential for annealing to form crystalline phases from an amorphous glass formed at higher temperatures.

EXAMPLE 6

A mixture was prepared comprising 52% and 44% by mass respectively of the abovementioned ZrSiO$_4$ and Al$_2$O$_3$ with 2% by mass of laboratory grade SrO and 2% by mass of laboratory grade ZnO. This mixture was prepared as described in Example 1, and samples thereof were prepared as described in Example 1. These samples were fired at a heating rate of 300° C./hr from ambient at 30° C. up to respective maximum temperatures of 1400° C., 1413° C., 1425° C. and 1450° C. All the samples were provided with a 4 hour hold at their maximum temperature, after which they were cooled at 300° C./hr to ambient temperature. Mechanical properties are shown in the following table, Table 6:

TABLE 6

| Maximum Sintering Temperature [°C.] | Hardness [GPa] | Toughness [MPa.m$^{\frac{1}{2}}$] |
|---|---|---|
| 1450 | 9,8 | 4,1 |
| 1413 | 11,2 | 3,2 |
| 1400 | 10,9 | 3,0 |

Figure 5:
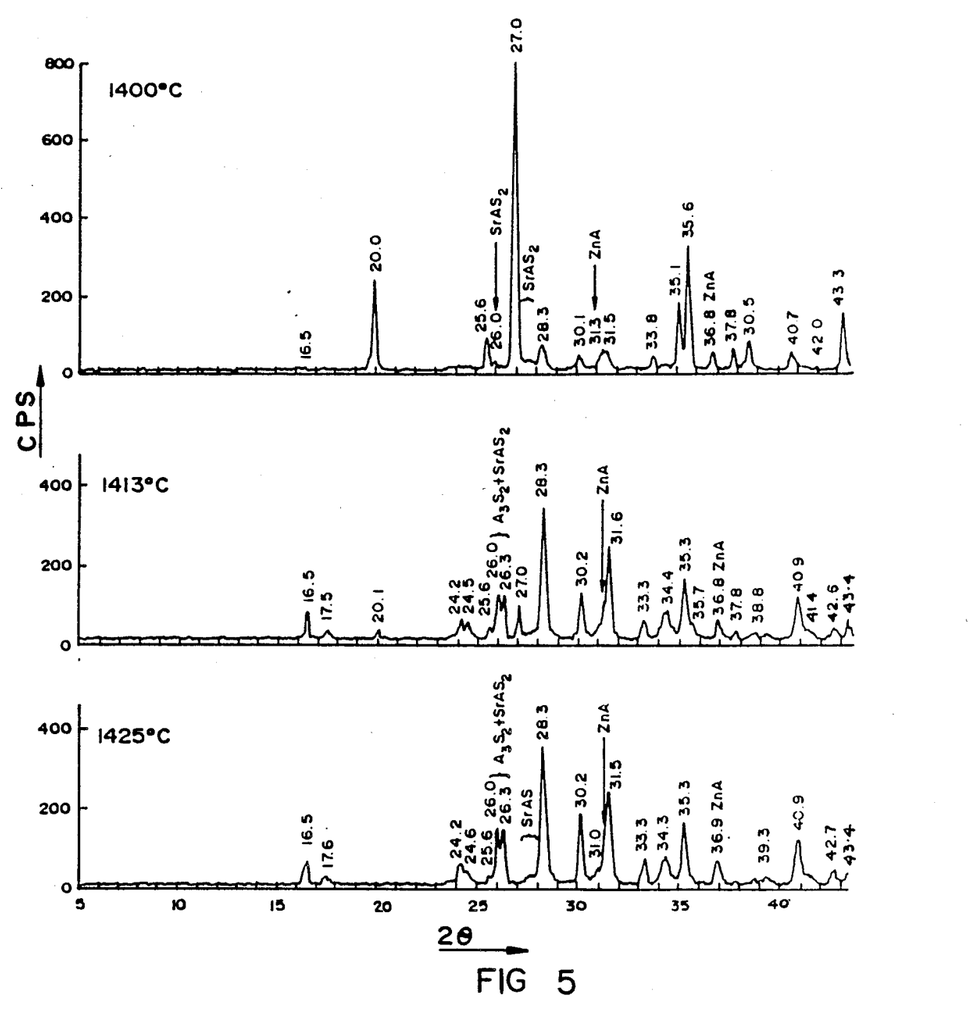
FIG. 5 illustrates X-ray diffraction traces of samples of artifacts made from zircon, alumina, strontium oxide and zinc oxide in accordance with the invention.

X-ray diffraction traces for the samples fired at 1400° C., 1413° C. and 1425° C. are shown in FIG. 5, and from these X-ray diffraction traces it appears that the reaction from zircon/alumina to zirconia/mullite is substantially complete at 1413° C.

EXAMPLE 5

Figure 6:
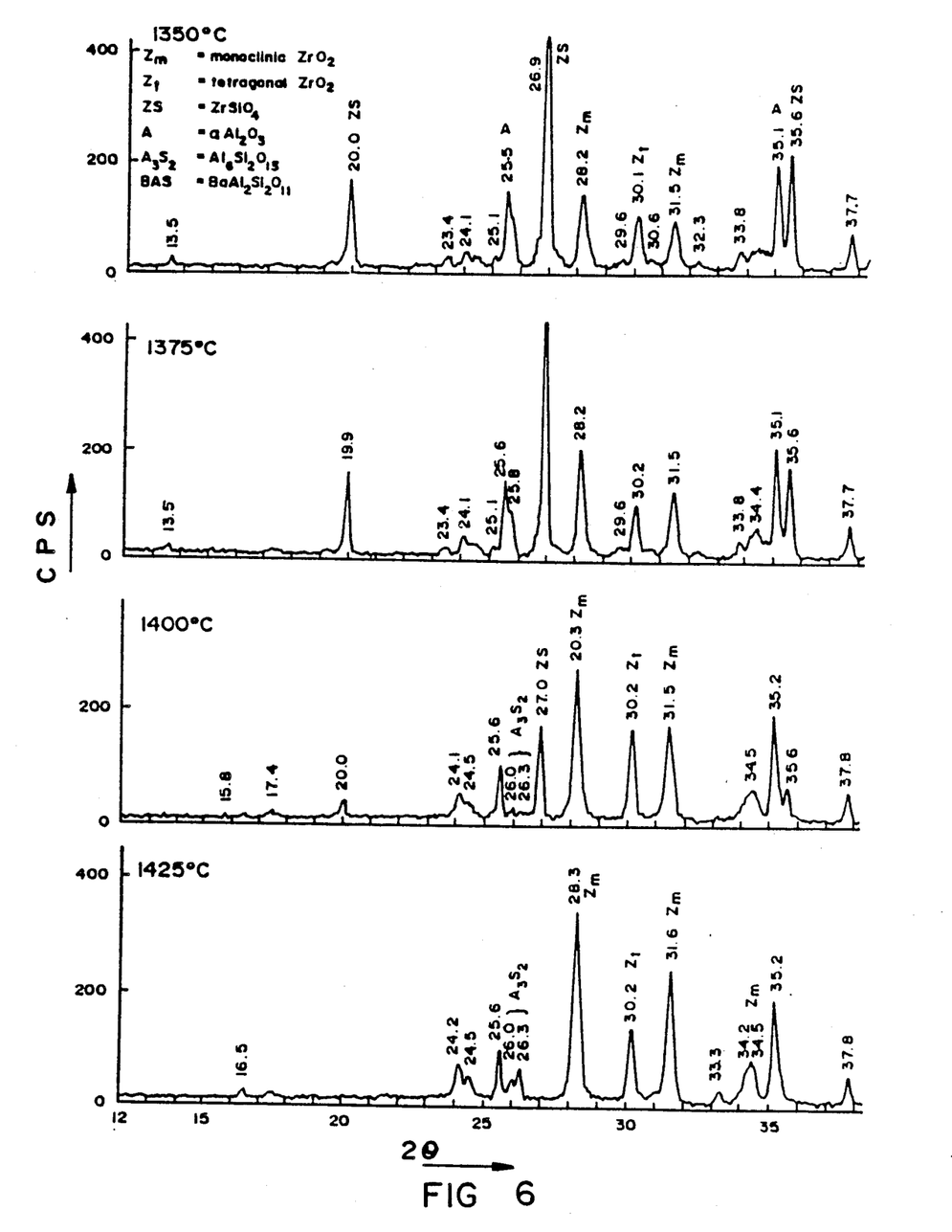
FIG. 6 illustrates X-ray diffraction traces of samples of artifacts employing a modified mixture of materials in accordance with the invention.

A mixture was made of 126 g of Cera Hydrate boehmite obtained from BA Chemicals Plc, Gerrads Cross, Buckinghamshire, England [boehmite is alpha-alumina monohydrate - Al$_2$O$_3$.H$_2$O], together with 2,6 g of laboratory grade Li$_2$CO$_3$, 119,8 g of the zircon described in Example 1 and 19,7 g of laboratory grade Ba[OH]$_2$.8H$_2$O. This gave a mixture, in terms of the oxides, of 43,5% by mass Al$_2$O$_3$, 1% by mass Li$_2$O, 51,5% by mass of ZrSiO$_4$ and 4% by mass BaO. This mixture was prepared in the same fashion as Example 4, and samples thereof were fired to respective maximum temperatures of 1350° C., 1375° C., 1400° C. and 1425° C. X-ray diffraction traces of these fired samples are shown in FIG. 6, from which it will be noted that the zircon/alumina conversion to zirconia/mullite is virtually complete at 1400° C.

A feature of the invention is that relatively low maximum sintering temperatures can be employed, with the attendant major practical advantages, to obtain a product of acceptable toughness, hardness and density. The lowering of the sintering temperature, at least as far as the Examples are concerned, is believed to be made possible by the use of the various dopants employed, which is believed to promote the decomposition of ZrSiO$_4$ into ZrO$_2$ and SiO$_2$ and to inhibit the recombination of these products into ZrSiO$_4$ upon cooling.

Furthermore, these dopants are believed to facilitate the reaction of SiO$_2$ and Al$_2$O$_3$ resulting in the formation of mullite according to the equation:

$$3Al_2O_3 + 2SiO_2 \rightarrow Al_6Si_2O_{13}$$

These dopants are believed to enhance densification of the ceramics produced, and to enhance the zircon/alumina reaction, possibly by the presence of transient or permanent liquid phases which may form during sintering, although other mechanisms may be responsible for the utility of the dopants.

By varying the nature of the dopant or dopants and the sintering conditions, the reaction may be taken to completion or stopped after partial completion according to the equation:

$$2ZrSiO_4 + 3Al_2O_3 \rightarrow 2ZrO_2 + Al_6SiO_{13}$$

Thus the final ceramic product may consist of zirconia-mullite or zircon-zirconia-alumina-mullite, together with minor phases or glasses, depending on the nature of the dopant used.

We claim:

1. A method of manufacturing a structural ceramic artifact including the steps of:
   forming a mixture in particulate form and with a particle size of at most 10 microns, of zircon or a precursor thereof, alumina or a precursor thereof, and a metal oxide dopant selected from the group consisting of barium oxide, strontium oxide, the precursors thereof, and mixtures of said metal oxides and precursors to provide a doped mixture of which said zircon or its precursor forms 20–80% by mass, the alumina or its precursor forms 20–80% by mass and said dopant forms 0.01–25% by mass;
   forming a green artifact from the mixture; and
   sintering the green artifact by heating up to a maximum temperature in the range 1200°–1700° C.

2. A method as claimed in claim 1, which includes dispersing in the mixture, prior to the sintering, 0.05–10% by mass of an additive oxide selected from the group consisting of boron oxide, calcium oxide, magnesium oxide, lithium oxide, titanium dioxide, the precursors thereof and mixtures of said additive oxides and their precursors.

3. A method as claimed in claim 1 in which the mixture has, before being sintered, an average particle size of at most 3.7 microns.

4. A method as claimed in claim 1, in which the sintering is by heating at a rate of 10°–600° C./hr from ambient temperature up to said maximum temperature, holding the maximum temperature for a period of at least one hour, and cooling the sintered material at a rate of 200°–500° C./hr.

5. A method as claimed in claim 4, which includes the step, during the cooling, of holding the temperature constant for a period of at least half an hour at a temperature, below the maximum temperature, in the range 1000°–1450° C.

6. A method as claimed in claim 1, which includes the steps, prior to the sintering, of dispersing a binder in the mixture and forming a green artifact from the mixture by pressing at a pressure in the range 2–200MPa.

7. A method as claimed in claim 1, which includes dispersing, in the mixture, prior to the sintering, at least 0.1% by mass of an additional metal oxide dopant selected from the group consisting of nickel oxide and zinc oxide, the precursors thereof and mixtures of said nickel oxide, zinc oxide and their precursors, the metal oxide dopants in total forming at most 25% by mass of doped mixture.

8. A method as claimed in claim 1, in which forming the mixture is by milling.

9. A method as claimed in claim 1, in which said maximum temperature is 1350°–1500° C.

* * * * *